United States Patent [19]

Eggemann et al.

[11] 4,016,442
[45] Apr. 5, 1977

[54] LIQUID-COOLED ROTOR OF ELECTRIC MACHINES AND METHOD OF PRODUCTION

[75] Inventors: Willi Eggemann; Erich Weghaupt, both of Mulheim (Ruhr), Germany

[73] Assignee: Kraftwerk Union Aktiengesellschaft, Mulheim (Ruhr), Germany

[22] Filed: Dec. 16, 1974

[21] Appl. No.: 533,318

[30] Foreign Application Priority Data

Dec. 20, 1973 Germany .......................... 2363644

[52] U.S. Cl. .................................................. 310/59
[51] Int. Cl.² ....................................... H02K 9/00
[58] Field of Search ............... 310/52, 53, 54, 58, 310/59, 60, 60 A, 61, 64

[56] References Cited

UNITED STATES PATENTS

| | | | |
|---|---|---|---|
| 3,131,321 | 4/1964 | Gibbs | 310/64 |
| 3,359,438 | 12/1967 | Hylen | 310/59 |
| 3,497,736 | 2/1970 | Cuny | 310/54 |
| 3,686,522 | 8/1972 | Konovalov | 310/54 |
| 3,740,595 | 6/1973 | Heller | 310/52 |
| 3,740,596 | 6/1973 | Curtis | 310/54 |
| 3,742,266 | 6/1973 | Heller | 310/54 |
| 3,878,413 | 4/1975 | Madsen | 310/59 |

*Primary Examiner*—R. Skudy
*Attorney, Agent, or Firm*—Herbert L. Lerner

[57] ABSTRACT

Liquid-cooled rotor for electric machines including shaft means formed with axial bores for feeding and withdrawing cooling liquid, and radial bores connecting the axial bores to cooling-liquid collecting chambers surrounding the shaft means, thin-walled tubes of corrosion-resistant material forming a lining for the cooling-liquid bores, the tubes being in firm rolled-in engagement with the surfaces defining the bore, along the entire lengths thereof, and diverting members fitted, into the axial bores at locations whereat the radial bores divert from the axial bores, the diverting members connecting the axial bores, respectively, with the radial bores; and method of producing the rotor.

6 Claims, 4 Drawing Figures

LIQUID-COOLED ROTOR OF ELECTRIC MACHINES AND METHOD OF PRODUCTION

The invention relates to a liquid-cooled rotor of electric machines, such as turbogenerators, especially, which have a shaft formed with axial bores for feeding and withdrawing cooling liquid for the rotor winding and radial bores connecting the axial bores to cooling-liquid collecting chambers surrounding the shaft, and a lining of the cooling-liquid bores that is formed of tubes of corrosion-resistant material. The invention also relates to a method of producing such a liquid-cooled rotor.

A rotor of the foregoing general type is known from U.S. Pat. No. 3,740,595 wherein, to prevent corrosion, all cooling-liquid paths in the rotor shaft and in the exciter shaft of the rotor are lined with removable inserts of corrosion-resistant material that have relatively strong walls and are inserted into the respective bores. Such a lining must be provided with adequate clearance so that, in the event of an accident, removal of the lining is possible, and freezing or sticking thereof due to rust formation is reliably avoided. Due to such an installation that is subject to play, very small faults in the material of the lining, such as pores, hair-line cracks and defects in the welded joints, already produce leaks in the lining which can lead to even greater leaks causing breakdown of the machine. Since welding operations are furthermore unavoidable during assembly with such linings, because of the required weldability of the material, corrosion-resistant austenitic steel must be used. Such austenitic steel, however, has a considerably higher coefficient of expansion than that of the steel of the rotor shaft, so that expansion compensators must be provided to equalize or balance the axial expansions of the linings that are generally several meters long. Such expansion compensators result, however, in a costly construction and a greater susceptibility to trouble. Furthermore, costly sealing of the clearance or gap between the lining and the rotor body is required which precludes any connection of the inner space of the generator, which is usually filled with hydrogen or is in vacuo, to the outside through the clearance or gap.

It is accordingly an object of the invention to provide a liquid-cooled rotor of the foregoing type with a lining for the cooling-liquid bores in the rotor shaft that is relatively simple to produce, affords the greatest possible tightness or impermeability and operational reliability, and furthermore provides the foregoing objectives without requiring any expansion compensators.

With the foregoing and other objects in view, there is provided, in accordance with the invention, a liquid-cooled rotor for electric machines comprising shaft means formed with axial bores for feeding and withdrawing cooling liquid, and radial bores connecting the axial bores to cooling-liquid collecting chambers surrounding the shaft means, thin-walled tubes of corrosion-resistant material forming a lining for the cooling-liquid bores, the tubes being in firm rolled-in engagement with surfaces defining the bores, along the entire lengths thereof, and diverting members fitted into the axial bores at locations whereat the radial bores divert from the axial bores, the diverting members connecting the axial bores, respectively, with the radial bores.

In accordance with another feature of the invention, the diverting members are formed with a respective blind-end bore having a substantially semicircular cross section and opening toward the axial lining tubes, the semicircular cross section continuously merging with the full circular cross section of the lining cross section of the lining tubes.

In accordance with an added feature of the invention, the radial bores, respectively, extend from the flat side of the semicircular cross section of the blind-end bore, the radial lining tubes being inserted in the respective radial bores and in firm rolled-in engagement with the surface defining the respective radial bores. Through this firm rolling of the lining tubes and the respective connection thereof with the diverter members, a very tight, impermeable lining and a firm connection between the lining and the rotor shaft is produced, thereby reliably avoiding different thermal expansions.

In accordance with an additional feature of the invention, the axial lining tubes and the diverting members have abutting surfaces at which they are secured by a weld.

In accordance with yet another feature of the invention, the radial lining tubes are disposed in liquid-tight and gas-tight rolled-in engagement in the collecting chambers that are formed of corrosion-resistant material.

In accordance with a concomitant feature of the invention, wherein the shaft means comprise aligned exciter and rotor shafts, there are included shaped members of corrosion-resistant material forming a lining in vicinity of coupling surfaces between the exciter and rotor shafts, the shaped members being formed with recesses and having free end faces for receiving sealing rings thereon.

In accordance with one mode of the method of producing the foregoing liquid-cooled rotor according to the invention, wherein the rotor includes shaft means formed with axial bores for feeding and withdrawing cooling liquid, and radial bores connecting the axial bores to cooling-liquid collecting chambers surrounding the shaft means, the method comprises firmly rolling-in a thin-walled tube lining of corrosion-resistant material within and along the entire length of the cooling-liquid bores, and connecting the axial bores to the radial bores at diverting locations by means of diverting members fitted into the axial bores.

In accordance with another mode of the method of the invention, the axial lining tubes and the diverting members are welded one to another at respective abutting surfaces thereof before inserting the same into the axial bores.

In accordance with yet another mode of the inventive method, wherein the collecting chambers are formed of corrosion-resistant material, the method includes rolling the radial lining tubes liquid-tightly and gas-tightly into the collecting chambers.

Other features which are considered as characteristic for the invention are set forth in the appended claims.

Although the invention is illustrated and described herein as embodied in a liquid cooled rotor of electric machines, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in conection with the accompanying drawings, in which.

Figure 1:
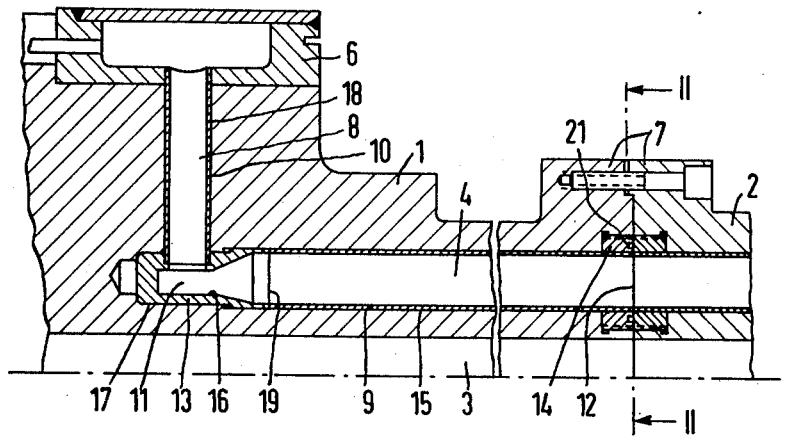
FIG. 1 is a longitudinal sectional view of the upper half of a rotor and exciter shaft in vicinity of the exciter coupling and a cooling liquid collecting chamber of a liquid-cooled rotor of an electric machine constructed in accordance with the invention.
Figure 2:
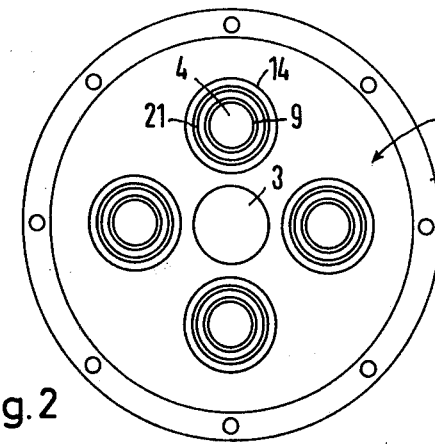
FIG. 2 is a view of the coupling surface of the rotor shaft of FIG. 1 in direction of the arrow II.

Referring now to the drawing and first, particularly, to FIG. 1 thereof, there is shown a shaft portion 1 of a turbogenerator rotor with an exciter or slip-ring shaft 2 coupled thereto. An axial bore 3 for receiving therein non-illustrated exciter current lines is formed along the shaft axis. The axial bore 3 is surrounded by several cooling liquid channels 4 as is especially apparent from FIG. 2. The non-illustrated excited winding of the rotor is supplied with cooling liquid in a conventional manner from the exciter-side shaft 2 through the cooling liquid channels 4. The cooling liquid is conducted from the axial channels 4 through radial cooling-liquid channels 8 into a cooling liquid collecting chamber 6 surrounding the shaft 1, wherefrom distribution of the cooling liquid to the winding occurs. The exciter shaft 2 is mechanically coupled with the rotor shaft 1 through a coupling flange 7.

The rotor shaft and the exciter shaft are formed of rustable steel and must be protected against corrosion in the vicinity of the cooling-liquid channels 4 and 8. the axial bores in which the channels 4 are located generally have a length of from 2 to 6 meters. In accordance with the invention of the instant application, all of the axial bores 15 and the radial bores 18 are lined with thin-walled tubes 9 and 10 of corrosion-resistant steel, such as stainless steel, which are slid into the bores with slight diametric clearance and are pressed, with a high compressive force against the wall surfaces of the bore formed in the shaft body, by a conventional tool formed essentially of a rotating roller head. In this process, the lining tubes 9 and 10 are plastically deformed. The extent of deformation is so great that a high lasting compression between the tubes 9 and 10 and the respective bore-wall surfaces is attained. This compression, even for a relatively short axial roll-in length, produces very good metallic sealing which is adequate both for liquids as well as for gases.

Figure 4:
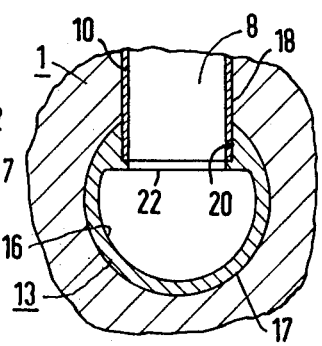
FIG. 4 is a cross-sectional view of FIG. 3 taken in direction of the arrows IV—IV.
Figure 3:
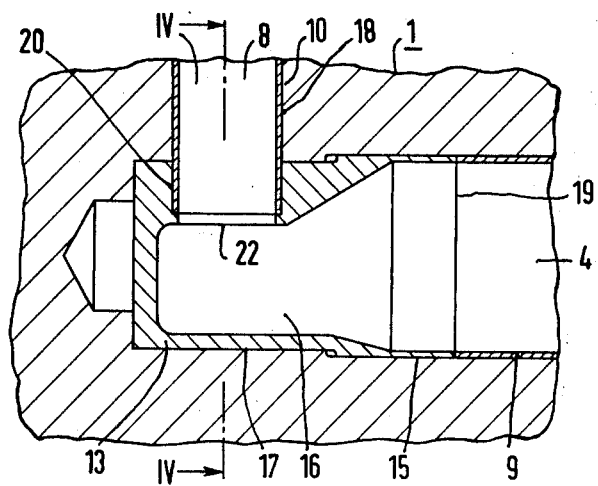
FIG. 3 is an enlarged fragmentary view of FIG. 1 in vicinity of a guide member.

At the junction or point of diversion of the axial cooling-liquid channels 4 and the respective radial channels 8, a separate diverter member or fitting 13 also of corrosion-resistant material is provided, as shown more clearly and in enlarged view in FIGS. 3 and 4. The diverter member 13, which is inserted into a press-fit seat 17 at the end of the axial shaft-bore 15, is formed with a blind-end bore 16 of substantially semicircular cross-section that continuously merges into the full circular cross section of the lining tube 9 on the end thereof which opens into the tube 9. In the vicinity of the radially extending cooling liquid bores 18, a radial bore 20, respectively, extends outwardly from the flat side 22 of the blind-end bore 16 of semicircular cross section, and a respective lining tube 10 is inserted and force-fitted therein by rolling in the manner mentioned hereinbefore.

Advantageously, before installing the axial lining tubes 9 and the diverter members 13, they are welded one to the other at their abutting joints 19 and then inserted into the axial bores 15. The axial tubes 9 are then pressure-rolled firmly, in the herein-before described manner, to the bore 15 starting from the abutting joints 19. Then, the radial lining tubes are inserted into the corresponding radial bores 18 and 20 of the rotor 1 and of the respective inverter member 13, and also pressure-rolled therein. Due to the planar termination of the tube 10 at the lower end thereof, as viewed in FIGS. 1, 3 and 4, which is produced by a corresponding construction of the side 20 of the blind-end bore 16, a high rolling strength or ruggedness is afforded.

In order also to ensure suitable tightness or imperviousness of the coupling 7 between the rotor shaft 1 and the exciter shaft 2, the sealing surfaces should also be formed of corrosion-resistant material, because not merely the abutting ends of the lining tubes 9 at this coupling 7 are to be sealed with respect to one another. For this reason, shaped members 14 of corrosion-resistant material and surrounding the axial bores 15 are inserted at the coupling surfaces 12. The shaped members 14 are formed with recesses 21 at the freely disposed end surfaces thereof, wherein conventional sealing rings are inserted. The shaped members 14 are of such dimension in axial direction that the lining tubes 9 are securely pressure-rolled also over the range thereof so that a faultless tightness or impermeability is achieved.

Due to this firm rolling-down of the lining tubes and the tight connection of the lining tubes 9 and 10 with the diverter members 13, absolute tightness and impermeability is assured. Pores or breaks occurring in the material of the tubes 9 or 10 or in the diverter members 13 accordingly have no effect whatsoever on the impermeability or tightness and upon the operational reliability of the lining, because leaks to the outside are reliably eliminated due to the relatively long lengths that are rolled-in. It can thereby be assumed that contact of the cooling liquid with the rusting steel of the rotor body through a fine hairline crack or through a pore formed in the lining, has no effect upon the purity of the cooling liquid so that no additional purifying devices are required because of the closed circulatory loop of the cooling liquid.

Additional expansion compensators are not required for the lining of the invention. Also, when weldable austenitic steel is used, movement between the lining and the rotor body is excluded, even when the materials thereof have different coefficients of expansion, because of the continuous extremely intensive rolling operation, only a negligible crack remains thereat, corrosion-resistant steels with a coefficient of expansion that matches that of the rotor steel can be used.

We claim:

1. A liquid cooled rotor for electric machines comprising shaft means, cooling liquid collecting chambers surrounding said shaft means, said shaft means including a plurality of axial bores for feeding and withdrawing cooling liquid and a plurality of radial bores connecting respective said axial bores to said cooling-liquid collecting chambers, a plurality of thin walled axial tubes and radial tubes of corrosion-resistant material forming linings for respective said axial and radial cooling-liquid bores, said tubes being in firm rolled-in press fitting sealing engagement with the surfaces defining the bores along the entire lengths thereof, and a plurality of diverting members fitted into respective said axial bores at locations whereat said radial bores divert from said axial bores, said diverting members each having an axially disposed opening and a radially disposed opening connecting said axial bores, respectively, with said radial bores.

2. The liquid-cooled rotor according to claim 1 wherein each said diverting member includes a bind-end axial bore having a substantially semicircular cross section including said axially disposed opening at one end adjoining respective said axial lining tubes, said semicircular cross section continuously merging with the full circular cross section of each said lining tube, respective said diverting members being in press fitting engagement within said axial bores.

3. The liquid-cooled rotor according to claim 2 wherein said radially disposed opening is at the outer end of said blind end axial bore, and a radial bore extends from and adjoins said radially disposed opening on the flat side of the semicircular cross section, said radial lining tubes being inserted in said radial bore and being in firm rolled-in press fitting sealing engagement with the surface defining said radial bore.

4. The liquid-cooled rotor according to claim 2 wherein said axial lining tubes and said diverting members have abutting surfaces at said circular cross-section.

5. The liquid-cooled rotor according to claim 1 wherein said radial lining tubes are disposed in a liquid-tight and gas-tight rolled-in engagement with said collecting chambers, said collecting chambers being formed of corrosion-resistance material.

6. The liquid-cooled rotor for electric machines comprising shaft means, cooling liquid collecting chambers surrounding said shaft means, said shaft means including a plurality of axial bores for feeding and withdrawing cooling liquid and a plurality of radial bores connecting respective said axial bores to said cooling-liquid collecting chambers, a plurality of thin-walled axial tubes and radial tubes of corrosion-resistant material forming linings for respective said axial and radial cooling-liquid bores, said tubes being in firm rolled-in press fitting sealing engagement with the surfaces defining the bores along the entire lengths thereof, and a plurality of diverting members fitted into respective said axial bores at locations whereat said radial bores divert from said axial bores, said diverting members each having an axially disposed opening and a radially disposed opening connecting said axial bores, respectively, with said radial bores, and wherein said shaft includes a central axial bore for receiving current lines, said plurality of axial bores for cooling-liquid being concentric with and spaced from said central bore.

* * * * *